United States Patent
Fujita

(10) Patent No.: US 7,578,272 B2
(45) Date of Patent: Aug. 25, 2009

(54) MULTIPLE CYLINDER ENGINE

(75) Inventor: Hideo Fujita, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 11/442,847

(22) Filed: May 30, 2006

(65) Prior Publication Data

US 2007/0028876 A1    Feb. 8, 2007

(30) Foreign Application Priority Data

May 30, 2005    (JP)    ............................. 2005-157830

(51) Int. Cl.
*F01L 1/34*    (2006.01)
(52) U.S. Cl. .............. 123/90.16; 123/90.39; 123/90.44; 123/90.6; 74/569
(58) Field of Classification Search .............. 123/90.15, 123/90.16, 90.17, 90.18, 90.2, 90.39, 90.44, 123/90.6; 74/559, 567, 569; 29/888.2
See application file for complete search history.

(56) References Cited

U.S. PATENT DOCUMENTS 4,424,790 A    1/1984    Curtil (Continued)

FOREIGN PATENT DOCUMENTS

DE    19708484    9/1998

(Continued)

OTHER PUBLICATIONS

International Search Report for Application No. PCT/JP03/06202.

(Continued)

*Primary Examiner*—Ching Chang
(74) *Attorney, Agent, or Firm*—Knobbe, Martens, Olson & Bear, LLP.

(57) ABSTRACT

A multiple cylinder engine includes a plurality of cylinders. Each cylinder includes a valve configured to open and close a port associated with each of the respective cylinders. The cylinders comprises at least a first cylinder group and a second cylinder group. A drive shaft is configured to rotate about an axis. A plurality of valve actuators are configured to transmit rotational movement of the drive shaft to the valve. A change mechanism comprises a control member that is configured to change a transmission state of the rotational movement transmitted from the drive shaft to the valve actuators. The change mechanism is configured to sequentially change an open period and a lift amount of each valve by changing a control amount of the control member. The control member is common to the first and second cylinder groups and the transmission states for the first cylinder group differs from the transmission states of the second cylinder group in accordance with the control amount of the control member. The valve open period and the lift amount of the valves in the first cylinder group is capable of being set to zero in a predetermined operational range to suspend operation of the first cylinder group.

10 Claims, 12 Drawing Sheets

U.S. PATENT DOCUMENTS

| | | |
|---|---|---|
| 4,572,118 A | 2/1986 | Baguena |
| 4,714,057 A | 12/1987 | Wichart |
| 5,018,487 A | 5/1991 | Shinkai |
| 5,189,998 A | 3/1993 | Hara |
| 5,373,818 A | 12/1994 | Unger |
| 5,433,284 A | 7/1995 | Chou |
| 5,601,056 A | 2/1997 | Kuhn et al. |
| 6,135,075 A | 10/2000 | Boertje et al. |
| 6,138,636 A * | 10/2000 | Kohno et al. ............ 123/198 F |
| 6,332,445 B1 | 12/2001 | Voss et al. |
| 6,386,162 B2 | 5/2002 | Himsel |
| 6,422,187 B2 | 7/2002 | Fischer et al. |
| 6,425,357 B2 | 7/2002 | Shimizu et al. |
| 6,431,129 B1 | 8/2002 | Hammound |
| 6,481,399 B1 | 11/2002 | Morrn |
| 6,659,053 B1 | 12/2003 | Cecur |
| 6,688,275 B2 * | 2/2004 | Shindou et al. .......... 123/198 F |
| 6,907,852 B2 | 6/2005 | Schleusener et al. |
| 7,069,890 B2 | 7/2006 | Fujita et al. |
| 7,096,835 B2 | 8/2006 | Fujita et al. |
| 7,168,403 B2 | 1/2007 | Fujita et al. |
| 2001/0052329 A1 | 12/2001 | Himsel |
| 2003/0116124 A1 | 6/2003 | Lawrence |
| 2004/0226524 A1 | 11/2004 | Hayman |
| 2005/0039723 A1 | 2/2005 | Miura |
| 2005/0126526 A1 | 6/2005 | Fujita et al. |
| 2005/0229882 A1 | 10/2005 | Fujita et al. |
| 2006/0075982 A1 | 4/2006 | Fujita et al. |
| 2006/0102120 A1 | 5/2006 | Fujita et al. |
| 2006/0107915 A1 | 5/2006 | Fujita et al. |
| 2006/0130459 A1 | 6/2006 | Warner |
| 2006/0207532 A1 | 9/2006 | Fujita et al. |
| 2006/0207533 A1 | 9/2006 | Fujita et al. |
| 2006/0243233 A1 | 11/2006 | Fujita et al. |
| 2007/0028876 A1 | 2/2007 | Fujita et al. |
| 2007/0204820 A1 | 9/2007 | Fujita et al. |

FOREIGN PATENT DOCUMENTS

| | | |
|---|---|---|
| DE | 198 48 602 A1 | 5/1999 |
| DE | 10123186 | 11/2002 |
| EP | 0 686 521 A2 | 12/1995 |
| EP | 0 822 135 A2 | 2/1998 |
| JP | 62-255538 | 11/1988 |
| JP | 63-309707 | 12/1988 |
| JP | 02-241916 | 9/1990 |
| JP | 06-017626 | 1/1994 |
| JP | 06-093816 | 5/1994 |
| JP | 06-272525 | 9/1994 |
| JP | 06-307219 | 11/1994 |
| JP | 07-063023 | 3/1995 |
| JP | 07-133709 | 5/1995 |
| JP | 07-293216 | 7/1995 |
| JP | 09-268907 | 10/1997 |
| JP | 11-036833 | 9/1999 |
| JP | 2000-213320 | 8/2000 |
| JP | 2001-263015 | 9/2001 |
| JP | 2002-371816 | 12/2002 |
| JP | 2003-027952 | 1/2003 |
| JP | 2003-106123 | 4/2003 |
| JP | 2003-148116 | 5/2003 |
| JP | 2003-201814 | 7/2003 |
| JP | 2003-239713 | 8/2003 |
| JP | 2004-316571 | 11/2004 |
| WO | WO 02/092972 | 11/2002 |
| WO | WO 03/098012 A1 | 11/2003 |
| WO | WO 2004/097186 A1 | 11/2004 |
| WO | WO 2005/019607 A1 | 3/2005 |
| WO | WO 2005/019609 A1 | 3/2005 |

OTHER PUBLICATIONS

International Search Report for Application No. PCT/JP03/06236.
International Search Report for Application No. PCT/JP2004/006426.
International Search Report for Application No. PCT/JP2004/006428.
International Search Report for Application No. PCT/JP2004/012191.
International Search Report for Application No. PCT/JP2004/012192.
International Search Report for Application No. PCT/JP2004/012193.
Anontaphan, Thitiphol. A study of a mechanical continuous rocker arm (VRA), SAE technical paper series 2003-01-0022, 2003 SAE World Congress Detroit, Michigan, Mar. 3-6, 2003.

* cited by examiner

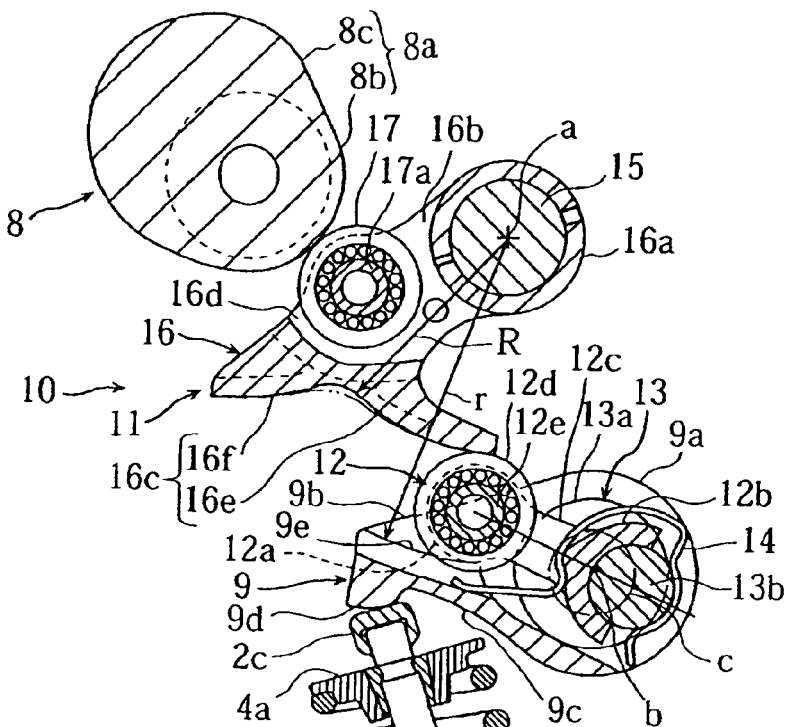
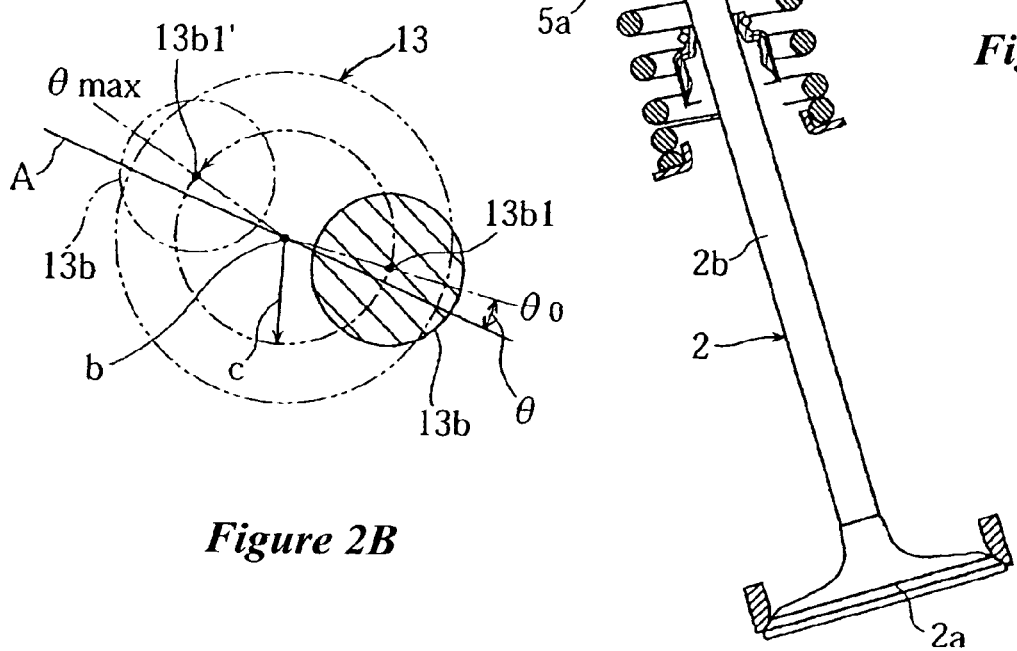
*Figure 2A*
*Figure 2B*

MULTIPLE CYLINDER ENGINE

PRIORITY INFORMATION

This application is based on and claims priority to Japanese Patent Application No. 2005-157830, filed May 30, 2005, the entire contents of which are hereby expressly incorporated by reference.

BACKGROUND OF THE INVENTION

1. Field of the Invention

The present invention relates to an internal combustion engine and, more particularly, to an internal combustion engine with multiple cylinders with valves that can be sequentially controllable.

2. Description of the Related Art

Some internal combustion engines include valve drive devices that are configured to sequentially control the open periods and lift amounts of intake and exhaust valves. In one example of this kind of valve drive device includes a camshaft, which drives a swing cam supported for swing movement. The swing cam actuates an intake valve or an exhaust valve between open and close positions. A center of the swing movement of the swing cam is variable. By varying the center of the swing movement, the open period and the lift amount of the valve can be sequentially changed.

In order to improve fuel consumption, an internal combustion engine can operate in the so-called "cylinder suspended mode". In such a mode, operation of a part of cylinder groups is suspended in a low load range. Japanese Patent Application JP-A-2004-316571 discloses an example of an engine that can operate in the cylinder suspended mode. The disclosed engine also includes a valve drive device by which the open period and the lift amount of respective valves are sequentially varied.

In the engine described in JP-A-2004-316571, the cylinders are divided into multiple cylinder groups each having a control shaft so that valve lift amounts can be controllable in every cylinder group. To suspend cylinder operation, the valve lift amount of a part of the cylinder groups can be brought to zero in a predetermined operational range.

SUMMARY OF THE INVENTION

The engine arrangement described above for realizing the cylinder suspended mode operation has multiple control shafts and employs a system in which the respective control shafts are controlled to have different rotational angles. However, it is quite difficult to ensure a space for the multiple control shafts in the engine that has the valve drive device by which the open period and the lift amount of respective valves are sequentially varied. In addition, the structure of the valve drive device is inevitably complicated and production costs thereof can increase.

Accordingly, one object of an aspect of the present invention is to provide a multiple cylinder engine that can suspend an operation of a part of cylinders without having a complicated structure or increasing production costs.

Accordingly, one aspect of the present invention is a multiple cylinder engine that includes a plurality of cylinders. Each cylinder includes a valve configured to open and close a port associated with each of the respective cylinders. The cylinders comprises at least a first cylinder group and a second cylinder group. A drive shaft is configured to rotate about an axis. A plurality of valve actuators are configured to transmit rotational movement of the drive shaft to the valve. A change mechanism comprises a control member that is configured to change a transmission state of the rotational movement transmitted from the drive shaft to the valve actuators. The change mechanism is configured to sequentially change an open period and a lift amount of each valve by changing a control amount of the control member. The control member is common to the first and second cylinder groups and the transmission states for the first cylinder group differs from the transmission states of the second cylinder group in accordance with the control amount of the control member. The valve open period and the lift amount of the valves in the first cylinder group is capable of being set to zero in a predetermined operational range to suspend operation of the first cylinder group.

Another aspect of the present invention is a multiple cylinder engine that comprises a plurality valves including a first group of valves and a second group of valves. A drive shaft is configured to rotate about an axis. A plurality of valve actuators are configured to transmit rotational movement of the drive shaft to the plurality of valves. A plurality change mechanisms are configured to change an open period or a lift amount of each of the valves by changing a control amount of a control member that is common to the plurality of change mechanisms. The control member is configured to change a state of the rotational movement transmitted from the drive shaft to the valve actuators by changing the control amount of the control member. As the control amount of the control member is changed, the transmission states for the first group of valves differs from the second group of valves.

Another aspect of the present invention is multiple cylinder engine that has a plurality valves comprising a first group of valves and a second group of valves. A drive shaft configured to rotate about an axis and to actuate a plurality of valve actuators configured to transmit rotational movement of the drive shaft to the plurality of valves. A plurality of change mechanisms are configured to change an open period and a lift amount of each of the valves by changing a control amount of a control member that is common to the plurality of change mechanisms. Means are provided for setting the open period and lift period of the first group of valves to zero in a predetermined operational range with the common control member while the open period and lift period of the second group of valves remain greater than zero.

Another aspect of the present invention comprises a method of operating a multiple cylinder in which during a first condition, with a plurality of valve drive mechanisms having a common control member an open period and a lift amount of a first group of valves and a second group of valves are adjusted. During a second condition, the common control member is actuated to change the open period and the lift amount of the first group of valves to zero while the open period and the lift amount of the second group of valves remains greater than zero.

Certain objects and advantages of the invention have been described above for describing the invention and the advantages achieved over the prior art. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Further objects, features and advantages of the invention will become apparent from the following detailed description taken in conjunction with the accompanying figures showing illustrative embodiments of the invention, in which:

FIG. 2A is a cross sectional, side elevational view of the valve drive device of FIG. 1 in a first position;

FIG. 2B is a schematic side view of a control section of the valve drive device of FIG. 2A;

DETAILED DESCRIPTION OF THE PREFERRED EMBODIMENTS

Figure 1:
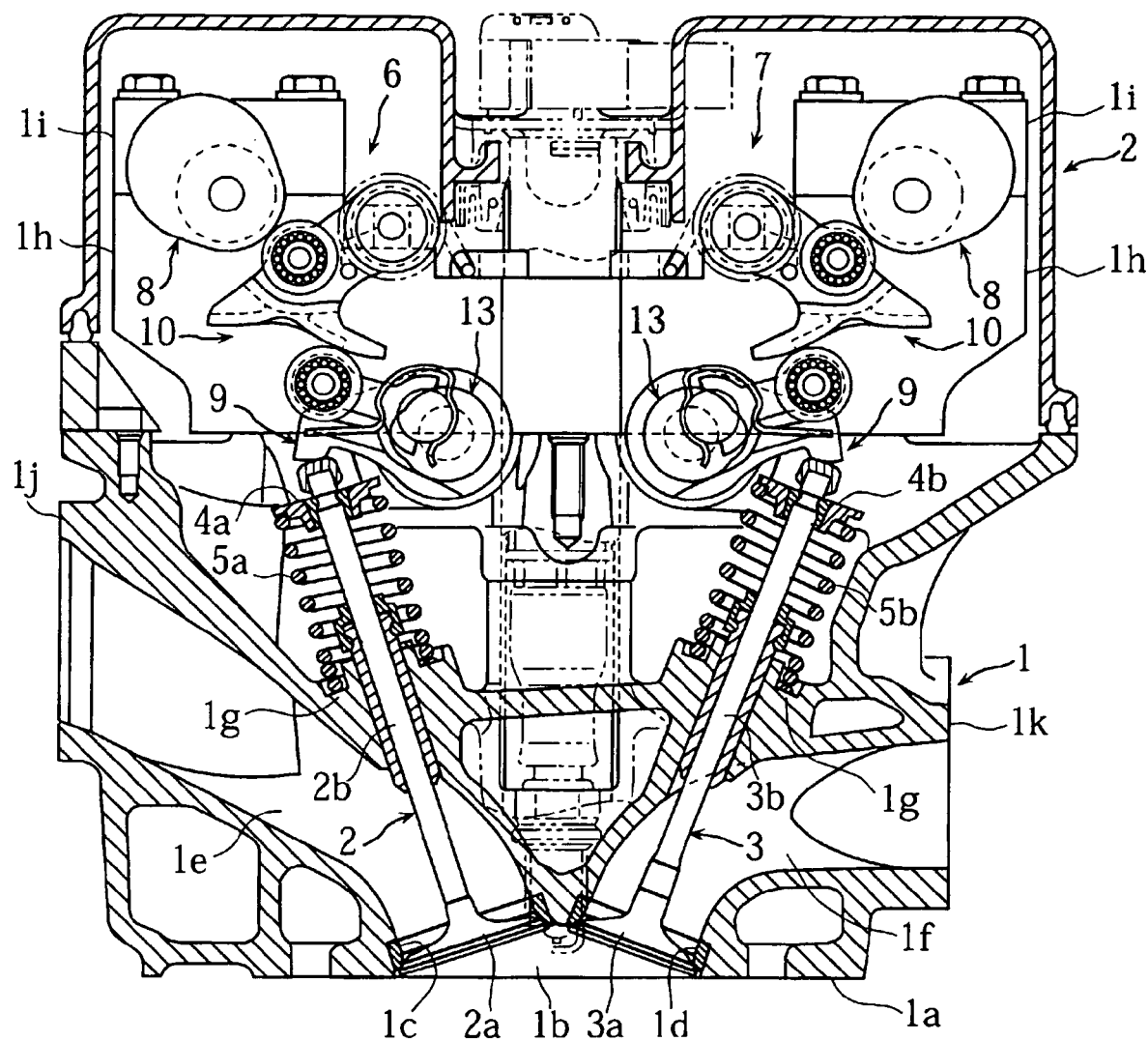
FIG. 1 is a cross sectional, side elevational view of a first embodiment of a valve drive device for a multiple cylinder engine.
Figure 3:
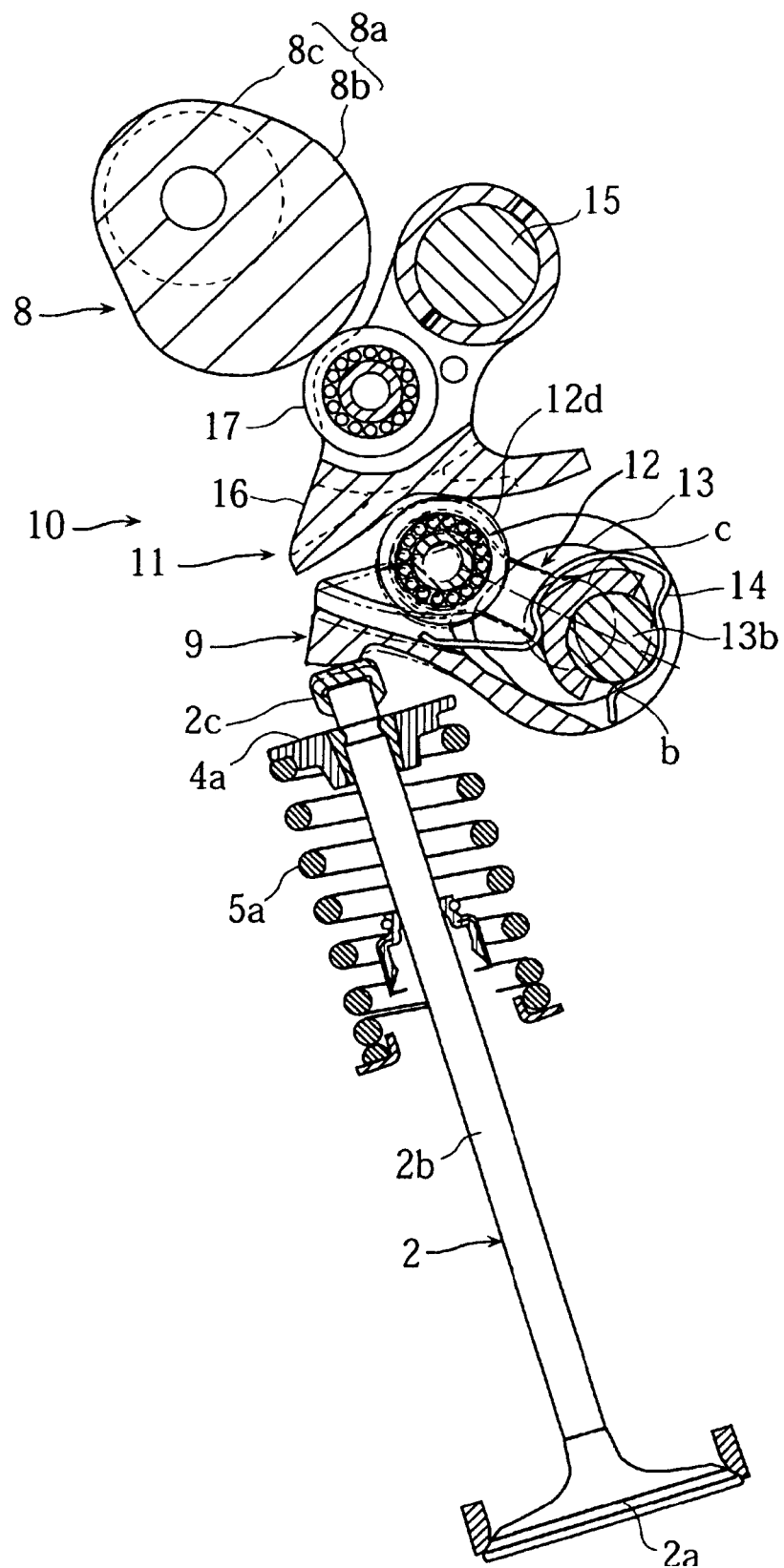
FIG. 3 is a cross sectional, side elevational view of the valve drive device of FIG. 1 in a second position.
Figure 4A:
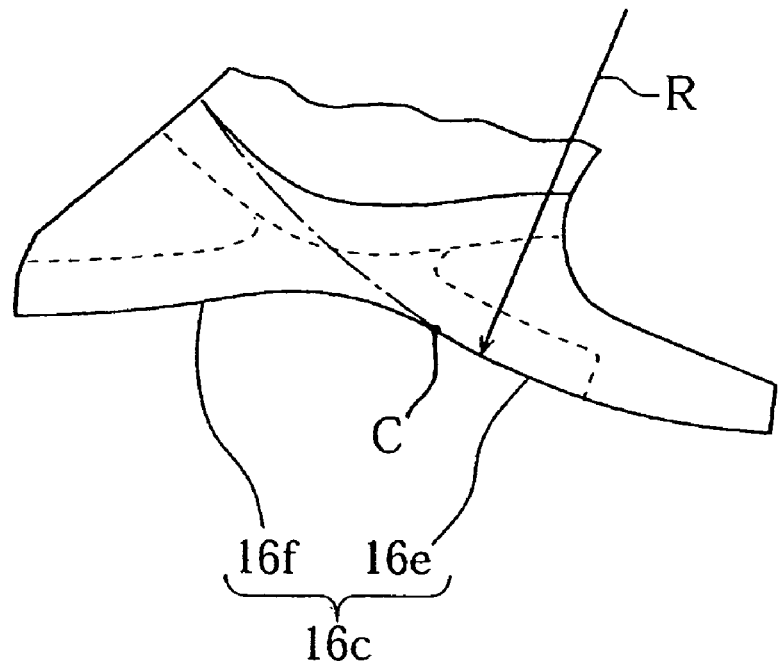
FIG. 4A is an enlarged view of a swing cam surface of the valve drive device of FIG. 1.
Figure 4B:
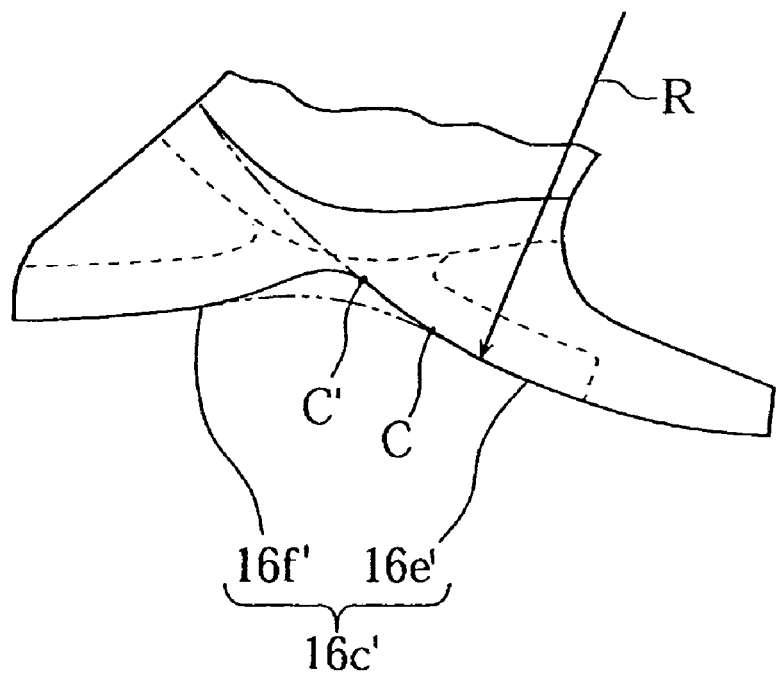
FIG. 4B is a enlarged view of another swing cam surface of the valve drive of FIG. 1.
Figure 5:
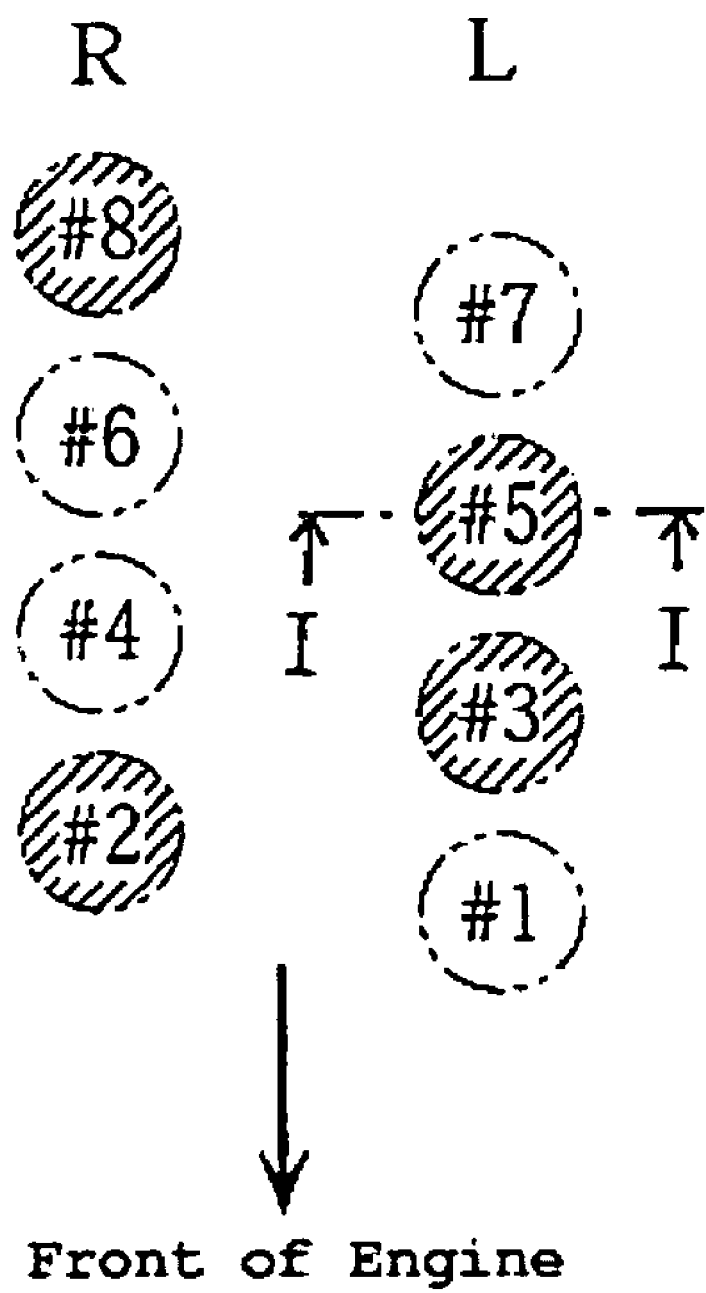
FIG. 5 is a schematic layout view of the engine of FIG. 1.
Figure 6:
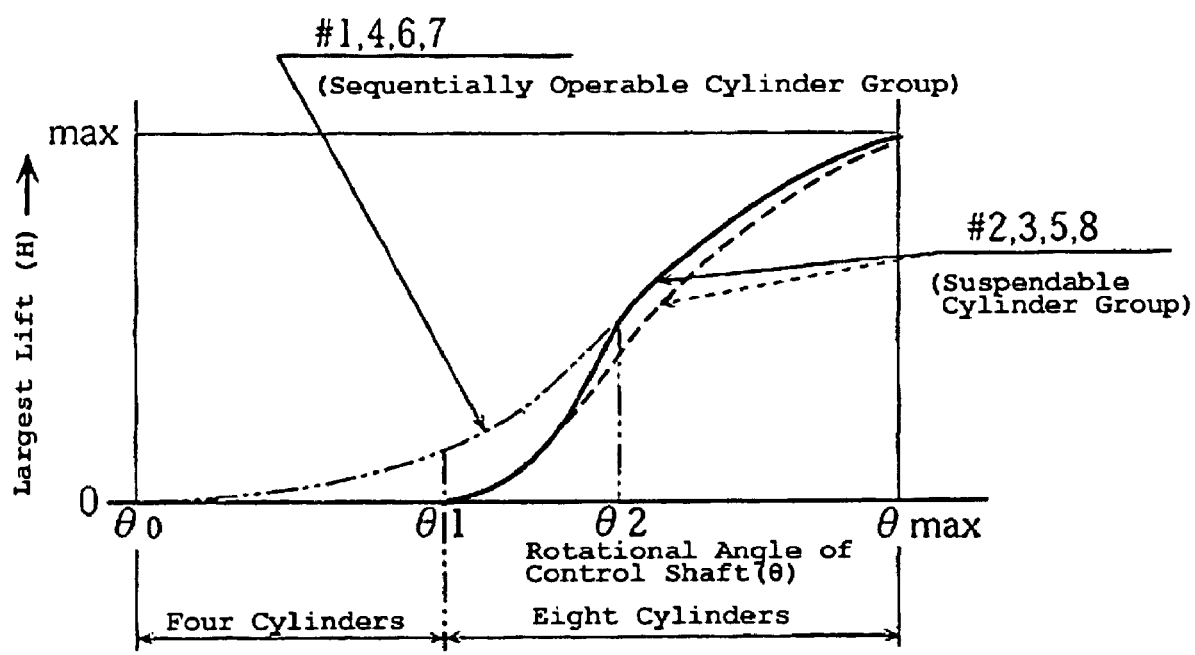
FIG. 6 is a graphical illustration of valve lift versus rotational angle for an embodiment of the valve drive device of FIG. 1.

With reference to attached drawings, an embodiment of a valve drive device will be described below. FIGS. 1 to 6 illustrate an embodiment of a multiple cylinder engine configured in accordance with the first embodiment. FIGS. 1 to 3 are cross sectional, side elevational views of the embodiment of the valve drive device. FIG. 4 is an enlarged view of a swing cam. FIG. 5 is a schematic view for describing cylinder groups. FIG. 6 is a characteristic diagram showing relationships between a control shaft rotational angle θ and the largest lift [H].

The engine of the illustrated embodiment can be a V-type, eight cylinder engine including a left bank which has four cylinders (#1, 3, 5 and 7 of FIG. 5) and a right bank which has four cylinders (#2, 4, 6 and 8 of FIG. 5). The large arrow of FIG. 5 indicates a front side of the engine. The reference symbols R and L indicate the right bank and the left bank, respectively.

The illustrated four-stroke cycle, multi-cylinder, V-type engine merely exemplifies one type of engine on which various aspects and features of the valve drive mechanism embodiments described herein can be used. Engines having other numbers of cylinders and having other cylinder arrangements (in-line, W, opposing, etc.) also can employ various features, aspects and advantages of the described embodiments. In addition, certain aspects and features of the embodiments described herein can be extended to engines that operate on different principles (e.g., two stroke, diesel etc.).

Each right and left bank can have a cylinder block, a cylinder head 1 coupled with a top end of the cylinder block and a head cover 2 detachably attached to the cylinder head 1. FIG. 1 is a cross sectional view taken along the line I-I of FIG. 5 (the cylinder #5 of the left bank). In modified embodiments, the cylinder block can be replaced with separate or substantially separate cylinder bodies.

A portion of a surface of each cylinder head 1 facing the respective cylinder block can be recessed to define combustion chambers 1b. Intake ports 1c and exhaust ports 1d can open to each combustion chamber 1b. Each intake port 1c and each exhaust port 1d can be connected to openings defined in an inner side wall 1j of the bank and an outer side wall 1k of the bank through an intake passage 1e and an exhaust passage 1f, respectively.

A valve head 2a of an intake valve 2 and a valve head 3a of an exhaust valve 3 can be positioned at each intake port 1c and each exhaust port 1d, respectively, to open or close the respective ports 1c, 1d. Valve springs 5a, 5b can individually extend between retainers 4a, 4b which are attached to top ends of valve stems 2b, 3b of the respective intake valve 2 and the exhaust valve 3 and spring seats 1g, 1g of the cylinder head 1. The springs 5a, 5b can urge the respective valves 2, 3 to their positions at which the valves 2, 3 close the respective ports 1c, 1d.

Intake valve position sequentially changing valve drive devices 6 can be individually provided for the right bank and for the left bank. Exhaust valve position sequentially changing valve drive devices 7 can be individually provided for the right bank and for the left bank. An open period and a lift amount of the intake valve 2 can be sequentially variable between zero (and/or substantially zero) and the maximum. Also, an open period and a lift amount of the exhaust valve 3 can be sequentially variable between zero (and/or substantially zero) and the maximum.

In this embodiment, the respective cylinders of the respective banks can be divided into a suspendable cylinder group which cylinders are operated in a cylinder suspended mode in which operations of those cylinders are suspended in a low load range, and a sequentially operable cylinder group which cylinders are sequentially operated in the whole operation ranges. For example, the cylinders #1 and #7 of the left bank can below belong to the sequentially operable group, and the cylinders #3 and #5 of the left bank belong to the suspendable cylinder group. Also, the cylinders #2 and #8 of the right bank can belong to the suspendable cylinder group, and the cylinders #4 and #6 of the right bank can belong to the sequentially operable group. See FIG. 5.

In the illustrated embodiment, each intake valve position sequentially changing valve drive device 6 and each exhaust valve position sequentially changing valve drive device 7 can have the same or substantially the same structure as one another except for some portions. Therefore, mainly, the intake valve position sequentially changing valve drive device 6 will be described below. Regarding the exhaust valve position sequentially changing valve drive device 7, the same reference numerals or symbols will be assigned to the components which are the same as the components of the intake side, and only certain different portions will be described below in detail.

With reference to FIG. 2, The intake valve position sequentially changing valve drive device 6 can include an intake camshaft (drive shaft) 8, intake rocker arms (valve actuator) 9 receiving rotational movement of the camshaft 8 transmitted therefrom to actuate the intake valve 2, and a change mechanism 10 positioned between the rocker arm 9 and the intake camshaft 8 to change transmission states of the rotational movement transmitted from the camshaft 8 to the intake rocker arm 9.

The change mechanism 10 can include intake swing cams 11 driven by intake cam noses 8a of the intake cam shaft 8, intermediate intake rocker arms (control arms) 12 driven by the respective intake swing cams 11, and a control shaft (control member) 13 supporting the intermediate intake rockers 12 and the intake rocker arms 9 for swing movement of the intermediate intake rockers 12. The intake swing cams 11, with its own swing movement, swing the respective intake rocker arms 9 via the intermediate intake rockers 12. With the swing movement of the rocker arms 9, the intake valves 2 axially move to open or close the intake ports 1c.

Each intake valve 2 can have one set of the intake cam nose 8a, the intake swing cam 11, the intermediate intake rocker 12 and the intake rocker arm 9. One control shaft 13 can be allotted to the left bank, and another control shaft 13 is allotted to the right bank.

The intake camshaft 8 can extend parallel to a crankshaft (not shown). The intake camshaft 8 can be fixed to the cylinder head 1 by a cam journal receiving member 1h attached to the cylinder head 1 and cam caps 1i attached to a top surface of the cam journal receiving member 1h for rotation but for not moving axially nor in a direction normal to its axis. Each cam nose 8a of the intake camshaft 8 can have a base circle section 8b having a certain outer diameter and a nose section 8c having a predetermined cam profile to open and close the associated intake valve in a suction stroke.

Each rocker arm 9 is formed with right and left base sections 9a, 9a both having a ring shape, right and left arm sections 9b, 9b both extending forward from the respective base sections 9a, 9a, and a bottom wall 9c unitarily joining them. The right and left base sections 9a, 9a can be supported by journal sections 13a, 13a of the control shaft 13, which can extend parallel to the intake camshaft 8 and can be positioned closer to a cylinder axis, for vertical swing movement but for not moving axially nor in a direction normal to those axes.

A valve pushing surface 9d can be formed at a bottom of a tip of the bottom wall 9c so as to push a shim 2c attached to a top end of each intake valve 2. Inner surfaces of the respective arm sections 9b, 9b can have shelf-like pressed surfaces 9e, 9e pressed by a pressing surface 12a of the intermediate rocker 12. Each pressed surface 9e can be formed as a circular arc having a radius [r] which center is inconsistent with a swing center [a] of the intake swing cam 11 in a view in the axial direction of the intake camshaft.

An offset pin section 13b can be positioned between the journal sections 13a, 13b of the control shaft 13. The offset pin section 13b can be unitarily formed with the control shaft 13 so as to deviate outward from an axis [b] of the control shaft 13 in its radius direction. The offset pin section 13b can have an outer diameter smaller than those of other portions of the control shaft 13.

A semi-circular engaging base section 12b of each intermediate intake rocker 12 can engage the offset pin section 13b for pivotal movement. A leaf spring or biasing member 14 can couple the engaging base section 12b and the offset pin section 13b with each other so that they are pivotable relative to each other but cannot be separated from one another.

Right and left arm sections 12c, 12c can be unitarily formed with the engaging base section 12b of the intermediate intake rocker 12 to extend forward. A rocker roller 12d can be positioned between front end portions of the right and left arm sections 12c, 12c to rollingly contact with a cam surface 16c of the swing cam 11. The rocker roller 12d can be journaled by a roller pin 12e extending through the right and left arm sections 12c, 12c in an axial direction of the control shaft 13. The pressing surfaces 12a, 12a can be formed at bottoms of front end portions of the right and left arm sections 12c, 12c. The respective pressing surfaces 12a can press the right and left pressed surfaces 9e of the intake rocker arms 9.

A drive mechanism (not shown) such as, for example, a servo motor can rotate the control shaft 13 and can controls a rotational angle θ of the control shaft 13 to be a desired angle. When drive mechanism changes the rotational angle θ of the control shaft 13, the rocker roller 12d and the pressing surface 12a of the intermediate intake rocker 12 move along the pressed surfaces 9e. Thereby, a substantial arm length of the rocker arm 9 changes and a position of the rocker arm 9 relative to the swing cam 11 also changes. The drive mechanism can control the rotational angle of the control shaft 13 in such a manner that, for example, in accordance with a rotational angle of an accelerator pedal, as the angle becomes larger, an opening and a lift amount of the intake valve can become larger.

With reference to FIGS. 2(a) and 2(B), in the illustrated embodiment, the offset pin section 13b pivots along a circle [c] which center is consistent with the axis [b] when the control shaft 13 pivots. When the rotational angle θ of the control shaft 13 is the minimum θ0 (for example, 15-20° relative to a reference straight line [A] extending through the axis [b]), the offset pin section 13b reaches the position 13b1 of FIG. 2(a). The intermediate rocker 12 thus is positioned at a retreat end (position indicated by the actual line of FIG. 2). More specifically, in the illustrated embodiment, the intermediate rocker 12 retreats to a position of a base circle section 16e at which a rollingly contacting point of the rocker roller 12 with the cam surface 16c is most close to the axis [b] of the control shaft 13. Therefore, both the valve open period and the lift amount are the minimum. When the rotational angle θ of the control shaft 13 is the maximum θmax (for example, 160-165° relative to the reference straight line [A]), the offset pin section 13b is placed at the position 13b1' of FIG. 2(a). The intermediate rocker 12 is positioned at an advance end (position at which the rollingly contact point is the furthest from the axis [b]), and both the valve open period and the lift amount are the maximum.

In the illustrated embodiment, a reason why the minimum rotational angle θ0 and the maximum rotational angle θmax of the control shaft 13 are set at the positions which are out of the reference straight line [A] is to promote a proper rate of a variation of the intermediate rocker 12 in a fore to aft direction relative to a variation of the rotational angle of the control shaft 13.

Each swing cam 11 can include a swing arm body 16 which is supported by the swing shaft 15 extending parallel to the intake camshaft 8 for swing movement but for not moving axially nor in a direction normal to an axis of the swing shaft 15, and a swing roller 17 journaled by the swing arm body 16. A spring or biasing member (not shown) can urge the swing arm body 16 clockwise in FIG. 2 so that the swing roller 17 rollingly contact with the cam nose 8a all the time.

The swing arm body 16 can have a cylindrical base section 16a and an arm section 16b. Both of the sections 16a, 16b can be unitarily formed with each other so that the arm section 16b extends from the base section 16a which is journaled by the swing shaft 15. A swing cam surface 16c can be unitarily formed at a tip of the arm section 16b. The arm section 16b has a roller space 16d in which the swing roller 17 is disposed. The roller space 16d can have a slit vertically extending through the arm section 16b. The roller pin 17a can journal the swing roller 17. The roller pin 17a can extend parallel to the swing shaft 15 and through the arm section 16b.

The swing cam surface 16c can include the base circle section 16e and a lift section 16f ranging to a distal end (i.e., end which is far spaced from the axis [b] of the control shaft 13) of the base circle section 16e. The base circle section 16e can be shaped as a circular arc which center is consistent with the axis [a] of the swing shaft 15 and has a radius [R]. Thus, during a period in which the base circle section 16e rollingly contacts with the rocker roller 12d, the swing angle of the intermediate rocker 12 does not vary and stays at zero, and, in turn, the swing angle of the rocker arm 9 does not vary and stays at zero, even though the swing angle of the swing cam 11 varies. The intake valve 2 can therefore be kept at the closing position and its lift amount is zero, accordingly.

On the other hand, as a portion adjacent to the top of the nose section 8c of the intake camshaft 8 pushes the swing roller 17 larger, i.e., as the swing angle of the swing cam 11 becomes larger, the lift section 16f swings the intermediate rocker 12 larger, and, in turn, the intermediate rocker 12 swings the rocker arm 9 larger and lifts the intake valve 2 larger.

The swing cam surface 16c for the sequentially operable cylinder group and the swing cam surface 16 for the suspendable cylinder group can differ from each other. For example, as shown in FIGS. 4(a) and 4(b), a border C' between the base circle section 16e' and the lift section 16f' of the swing cam surface 16c' (see FIG. 4(b)) can deviate toward the lift section 16f more than a border C of the swing cam surface 16c (see FIG. 4(a)). That is, the base circle section 16e' for the suspendable cylinder group is broader than the base circle section 16 for the sequentially operable cylinder group by the area between the borders C-C' shown in FIG. 4(b).

On the other hand, as the lift section 16f' for the suspendable cylinder group is spaced apart from the border C' further, a shape of the lift section 16f' can become more similar to a shape of the lift section 16f for the sequentially operable cylinder group. In this embodiment, the major part of the shape of the lift section 16f' is the same as the shape of the lift section 16f.

Because the shapes of the respective cam surfaces differ from each other, the open periods and the lift amounts of the respective intake valves 2 can be controlled based upon control characteristics which are different between one for the sequentially operable cylinder group and the other for the suspendable cylinder group. One embodiment of different control characteristics will be described based upon the characteristic curves of FIG. 6 which is an example of the relationships between the control shaft rotational angle (θ) and the largest lift (H).

In FIG. 6, the horizontal axis indicates the rotational angle θ, while the vertical axis indicates the largest lift [H] when the control shaft is in a certain rotational angle θ.

Regarding the sequentially operable cylinder group (#1, 4, 6 and 7), as indicated by the chain double-dashed line of FIG. 6, in the illustrated embodiment, the largest lift [H] smoothly increase from 0 to the maximum with the rotational angle θ of the control shaft 13 increasing from θ0 to θmax.

On the other hand, regarding the suspendable cylinder group (#2, 3, 5 and 8), as indicated by the actual line of FIG. 6, in the illustrated embodiment, the largest lift [H] can be kept at or near zero before the rotational angle θ of the control shaft 13 increases from θ0 to θ1. When the rotational angle θ of the control shaft 13 further increases from θ1, the largest lift [H] starts increasing. When the rotational angle θ exceeds θ2, the largest lift [H] can become equal to the largest lift [H] for the sequentially operable cylinder group.

For example, in a high speed and high load range, the control shaft 13 is driven so that the rotational angle θ can become, for example, θmax. Under this condition, the respective intermediate rockers 12 are positioned at the advance ends, the largest lift [H] of the valves for both of the sequentially operable cylinder group and the suspendable cylinder group can become the maximum.

On the other hand, as the operation of the engine approaches a middle speed and middle load range further, the control shaft 13 is driven so that the rotational angle θ becomes smaller. For example, when the rotational angle θ becomes smaller than θ2, the largest lift for the suspendable cylinder group can become smaller than the largest lift for the sequentially operable cylinder group as shown in FIG. 6. When the rotational angle θ becomes smaller than θ1, the largest lift for the suspendable cylinder group can become zero. Thus, the operation of the cylinders of the suspendable cylinder group can be suspended. Regarding the sequentially operable cylinder group, the largest lift gradually decreases with the rotational angle θ of the control shaft 13 decreasing.

As thus described, in the illustrated embodiment, the operation of the cylinders of the suspendable cylinder group can be suspended while the operation of the sequentially operable cylinder group can be continued using the valve position sequentially changing valve drive device. In addition, for example, if attention is paid to the left bank, even though the single and common control shaft 13 controls all of the cylinders #1, 3, 5 and 7, the cylinders #1 and 7 can be sequentially operated and the remainder cylinders #3 and 5 can be suspended. Thus, differently from the conventional devices, this device does not need to have two control shafts. The overall size of the valve drive device can be reduced and a space for the control shaft can be easily ensured. The structure is not as complicated as the prior art, and the parts count and production costs do not increase.

Another advantage is that the simple structure in which the cam surfaces 16c of the swing cams 11 differ from each other, one for the suspendable cylinder group and the other for the sequentially operable cylinder group.

In this embodiment, when a mode in which all cylinders operate is changed to another mode in which some part of the cylinders are suspended, first, the largest lift for the suspendable cylinder group gradually decreases, and then the operation of the cylinders of this group can be suspended. Similarly, when the mode in which some part of the cylinders are suspended can be changed to the mode in which all cylinders operate, the largest lift for the restarting cylinders gradually increases. Therefore, the change to the part cylinder suspended mode or to return to the whole cylinder operating mode can be smoothly made. Any shocks following the mode changes can be removed or reduced.

A problem can arise such that the maximum power of the engine, particularly, in the high speed and high load range can decrease because the cylinder suspended operation is realized. In this embodiment, when the rotational angle θ exceeds θ2, the largest lift for the suspendable cylinder group becomes consistent with the largest lift for the sequentially operable cylinder group. The problem thus can be avoided.

Additionally, the right bank operates similarly to the left bank discussed above. The right bank thus can have the same actions and can enjoy the same advantages. Also, the exhaust valve position sequentially changing valve drive devices in the right and left banks operate similarly, and thus can have the same actions and can enjoy the same advantages.

In the embodiment, by setting the cam surfaces of the swing cams for the suspendable cylinder group differently from those for the sequentially operable cylinder group, the single control shaft can sequentially change the valve opening periods and the lift amounts of both of the banks so as to realize the suspension of the operation of the part of the cylinders. The first embodiment discussed above, however, does not limit ways for realizing the suspension of the operation of the part of the cylinders.

Figure 7:
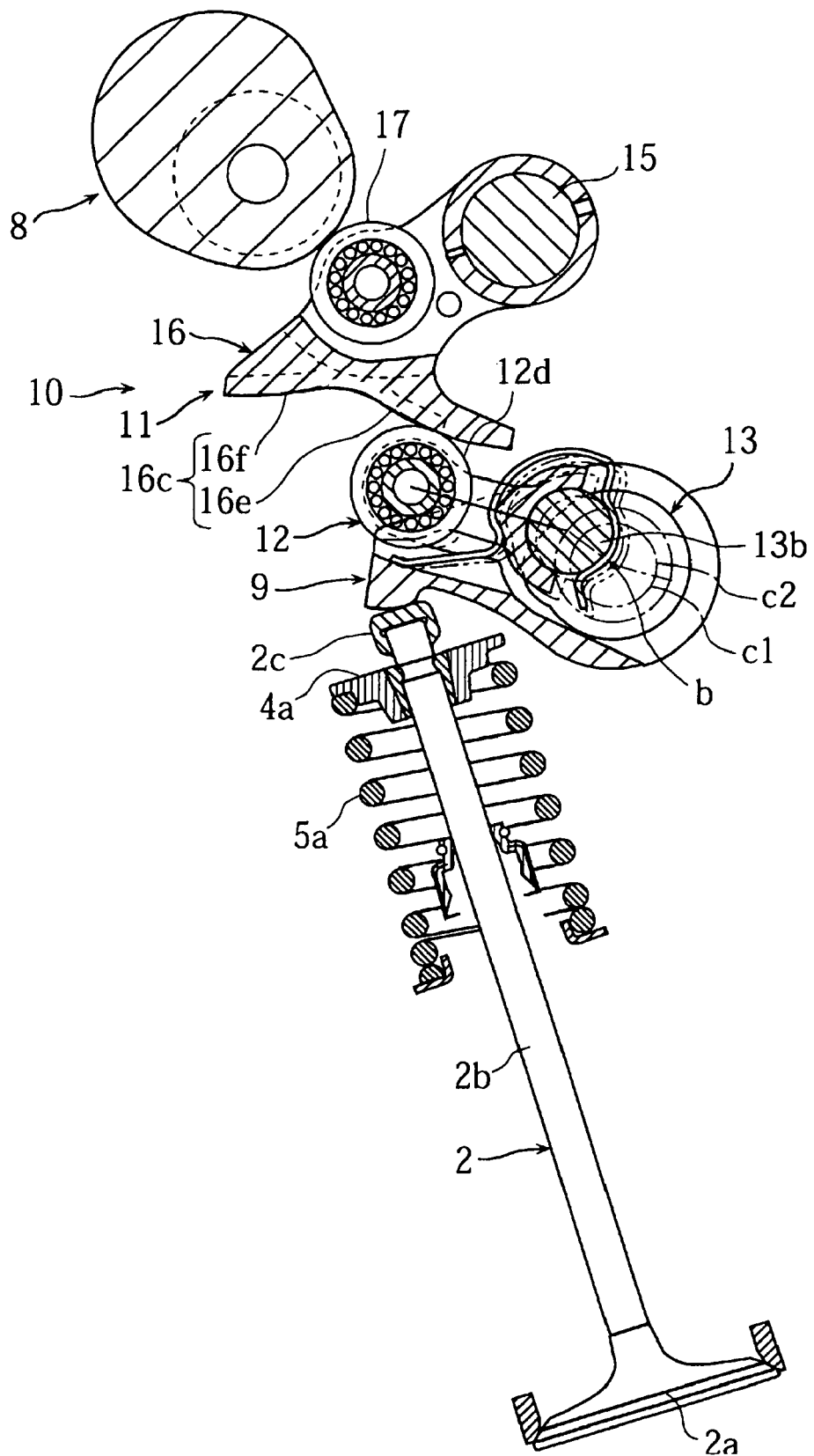
FIG. 7 is a cross sectional, side elevational view of another embodiment of a valve drive device in a first position.
Figure 8:
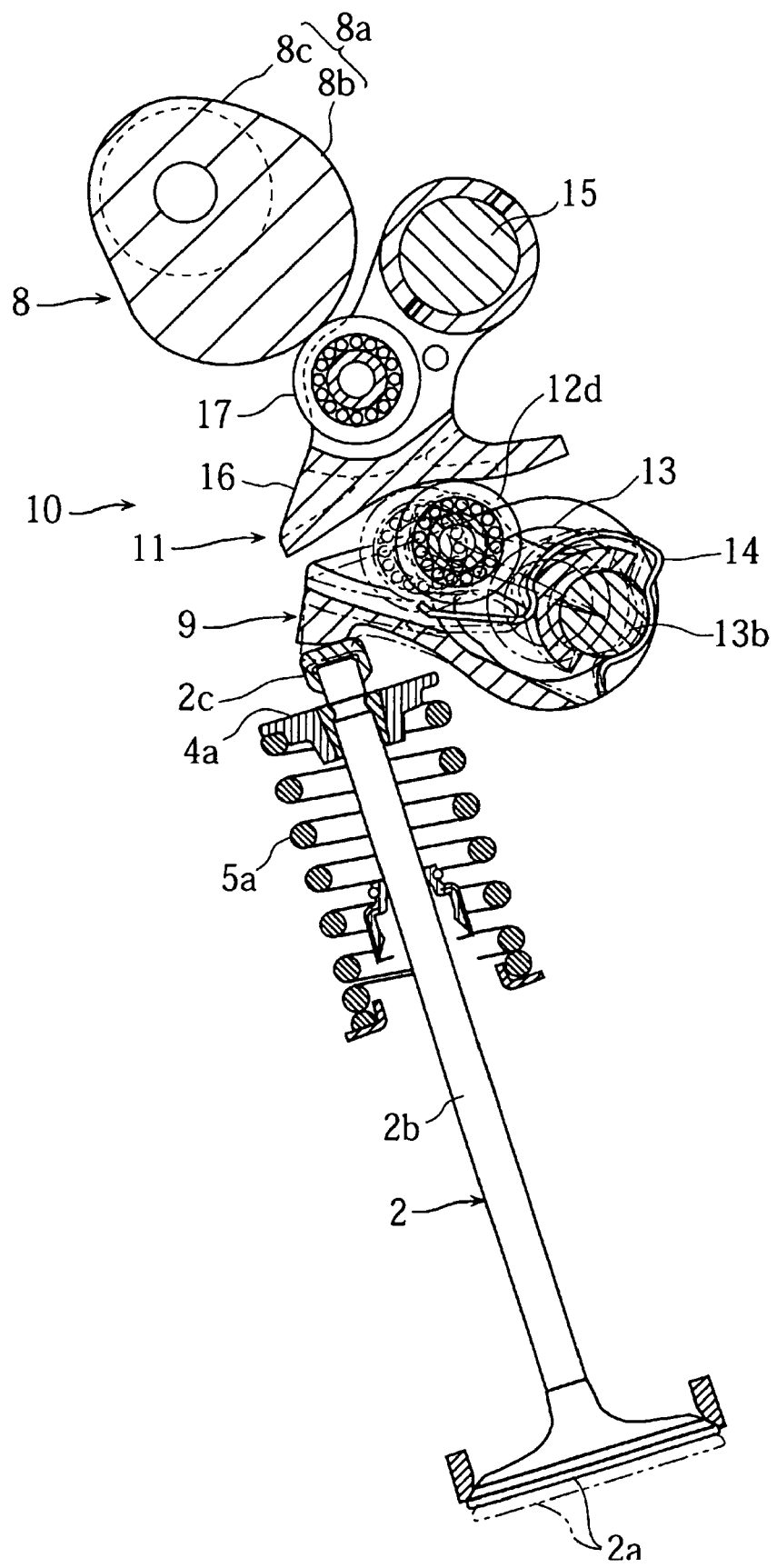
FIG. 8 is a cross sectional, side elevational view of the valve drive device of FIG. 7 in a second position.
Figure 9:
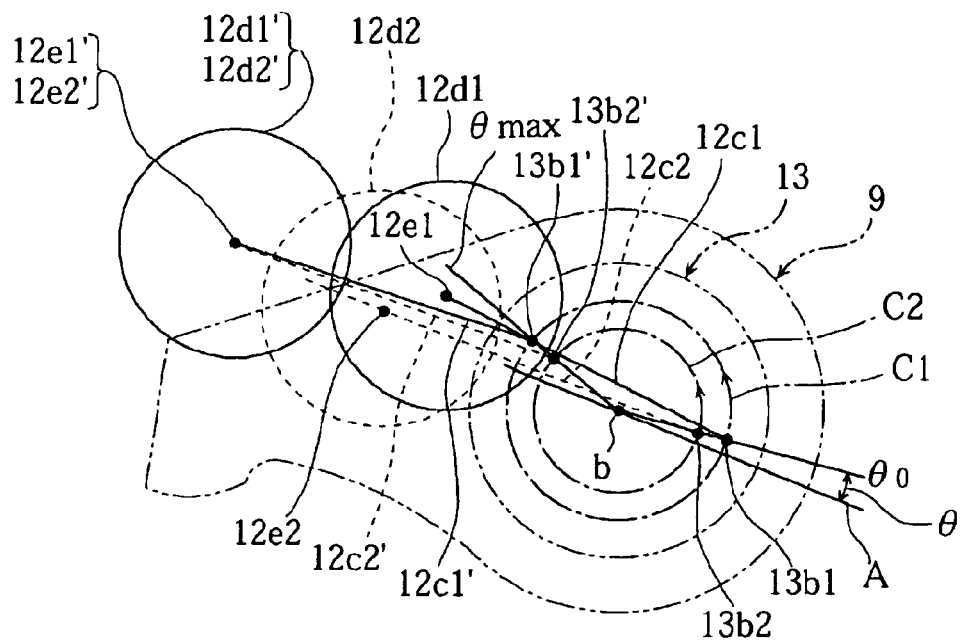
FIG. 9 is a schematic side elevational view of the valve drive device of FIG. 7.

For example, FIGS. 7 to 9 are illustrations of a second embodiment of a valve drive device. In these figures, the same reference numerals or symbols as those of FIGS. 1 to 3 indicate the same or similar components and portions.

In the second embodiment, a deviation amount [c] of each offset pin section 13b from the axis [b] of the control shaft 13 and an arm length of each intermediate rocker 12 are differently set between the sequentially operable cylinder group and the suspendable cylinder group; thereby, the same actions and effects as those of the first embodiment can be obtained.

For example, as shown in FIG. 9, when the control shaft 13 pivots, each offset pin section 13b1 for the suspendable cylinder group can pivot along an offset circle [c1] which deviation amount from the axis [b] is [c1], while each offset pin section 13b2 for the sequentially operable cylinder group can pivot along an offset circle [c2] which deviation amount from the axis [b] is [c2]. The amount [c1] can be larger than the amount [c2]. Also, a length of each intermediate rocker arm 12c2 for the sequentially operable cylinder group can be longer than a length of each intermediate rocker arm 12c1 for the suspendable cylinder group by the length (c1−c2)/2.

Therefore, when the rotational angle of the control shaft 13 is the minimum θ0, the rocker rollers 12d1 for the suspendable cylinder group can retreat more than the rocker rollers 12d2 for the sequentially operable cylinder group. For example, a contacting point of each rocker roller 12d1 for the suspendable cylinder group with the cam surface 16c can be positioned at a location adjacent to the axis [b] of the control shaft 13. On the other hand, when the rotational angle of the control shaft 13 is the maximum θmax, the rocker rollers 12d1 for the suspendable cylinder group and the rocker rollers 12d2 for the sequentially operable cylinder group are positioned at the same locations in the fore to aft direction.

Thus, the open period and the lift amount of each intake valve 2 can be controlled based upon characteristics which differ from each other between the sequentially operable cylinder group and the suspendable cylinder group. Specifically, they are controlled to change along the dashed line of FIG. 6.

With reference to FIG. 6, regarding the sequentially operable cylinder group (#1, 4, 6 and 7), similarly to the first embodiment, the largest lift [H] smoothly varies from 0 to the maximum while the rotational angle θ increases from θ0 to θmax.

On the other hand, regarding the suspendable cylinder group (#2, 3, 5 and 8), the largest lift [H] is kept to be zero before the rotational angle θ of the control shaft 13 increases from θ0 to θ1. When the rotational angle θ of the control shaft 13 further increases from θ1, the largest lift [H] starts increasing. With the rotational angle θ increasing much more, the largest lift for the suspendable cylinder group gradually approaches the largest lift for the sequentially operable cylinder group, and the largest lifts for both of the groups become equal to each other when the rotational angle approaches to the vicinity of the maximum θmax.

In the second embodiment, the substantially same or same actions and effects as those of the first embodiment can be obtained. Particularly, the largest lift for the suspendable cylinder group can become gradually smaller than the largest lift for the sequentially operable cylinder group when the rotational angle of the control shaft 13 becomes smaller than the maximum θmax. Thus, the changes between the whole cylinder operating mode and the part cylinder suspended mode can be more smoothly made, and any shocks following the mode changes can be almost completely removed.

The cylinder partially suspended control can be realized simply by the structure in which the deviation amount of each offset pin 13b from the axis [b] of the control shaft 13 and the length of each intermediate rocker 12 are set differently.

Figure 10:
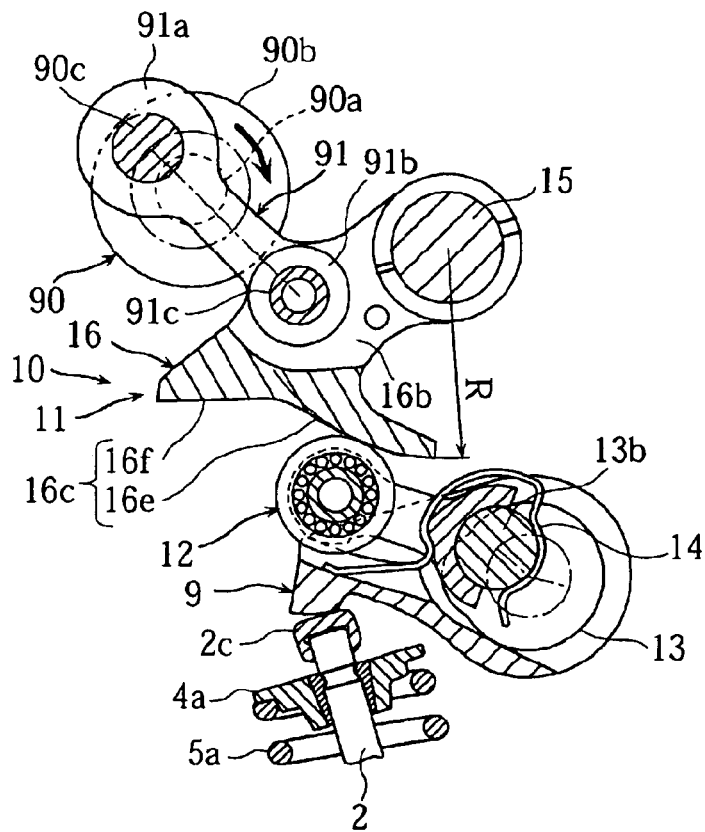
FIG. 10 is a cross sectional, side elevational view of another embodiment of a valve drive device.

In the first and second embodiments, the drive shaft acting as the drive source for actuating the valves is the camshaft, and each swing cam is compulsively swung toward the opening position and the swing cam is urged to swing toward the closing position by the spring. However, as shown in FIG. 10 in a third embodiment, the swing cam is swung toward both of the opening and closing positions. In FIG. 10, the same reference numerals or symbols as those of FIG. 2 indicate the same or similar components and portions.

In the third embodiment, a crankshaft 90 replaces the camshaft. The crankshaft 90 can include a shaft body 90a, a pair of disk-like crank arms 90b, 90c which have an outer diameter larger than an outer diameter of the shaft body 90a, and a crank pin 90c positioned between the crank arms 90b, 90b and is deviated outward from an axis of the shaft body 90a in a radius direction.

A connecting rod 91 can connect the crankshaft 90 and the arm body 16 of the swing cam 11 to each other. One end 91a of the connecting rod 91 is coupled with the crank pin 90c, while the other end 91b thereof is coupled with the arm body 12. In the third embodiment, the urging spring 14 used in the first and second embodiments is not necessary.

In the third embodiment, the swing cam 11 is swung toward both of the valve opening and closing directions together with the crankshaft 90 rotating. For example, whole of the cylinders of the sequentially operable cylinder group and the suspendable cylinder group are operated in the high speed and high load range, while only the cylinders of the suspendable cylinder group are suspended in the low speed and low load range because the largest lift for the suspendable cylinder group is kept at zero.

As thus discussed, because the crankshaft 90 swings the swing cam 11 in both of the opening and closing directions in this embodiment, the cam surface 16c of the swing cam 11 can push the rocker arm 9 down, and, in turn, the intake valve 2 can open and close the intake port. In this embodiment, the valve train device can use the methods of suspending cylinders described above with respect to the first and/or the second embodiments.

In the first through third embodiments, each control arm (intermediate rocker) 12 can be interposed between the swing cam 11 and the rocker arm 9. However, the position of the control arm according to the present invention is not limited to those in the embodiments.

Figure 11:
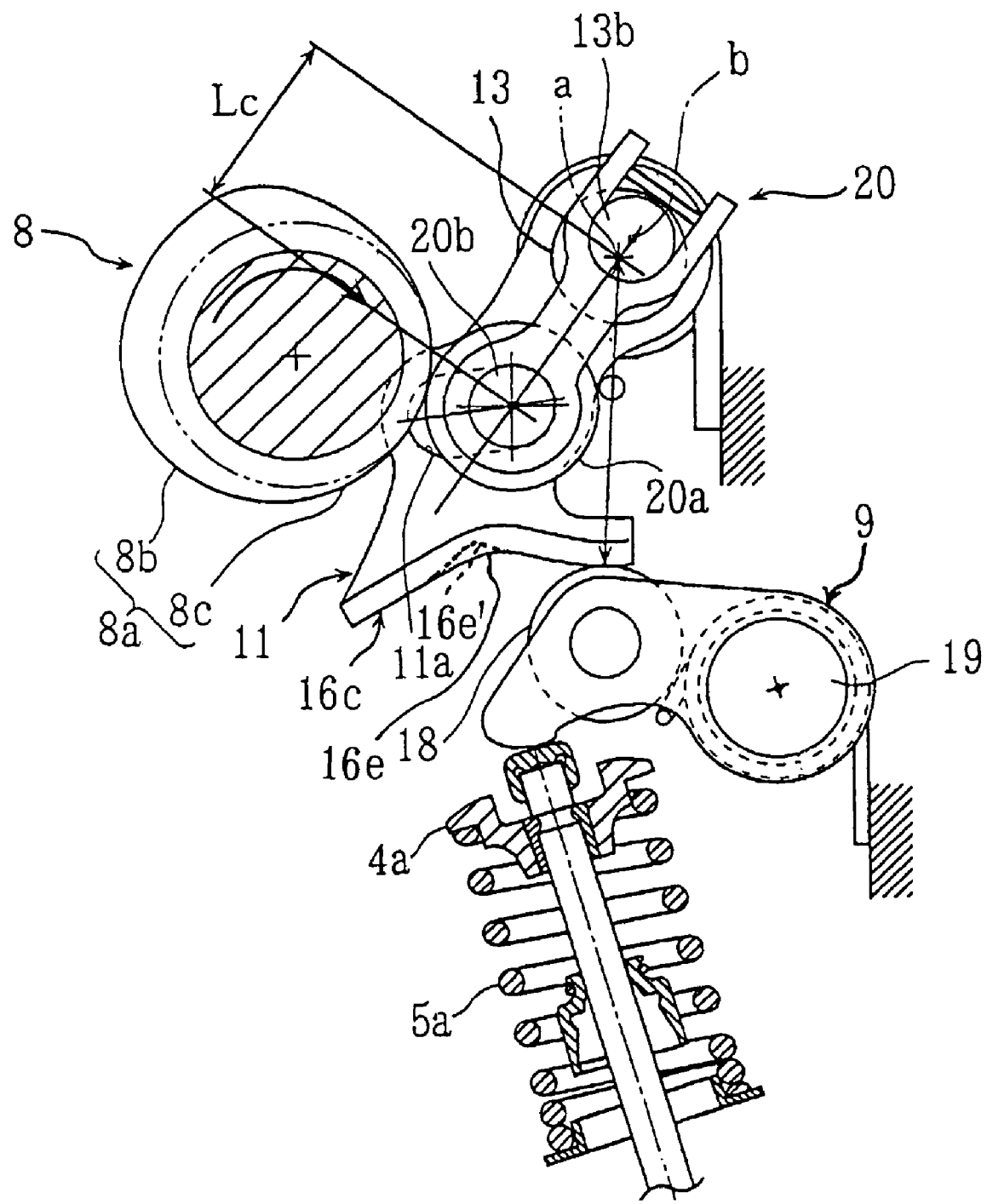
FIG. 11 is a schematic side view of another embodiment of a valve drive device.

For example, FIG. 11 is an illustration for describing a fourth embodiment in which the control arm is positioned between the swing cam and the camshaft. The same reference numerals or symbols as those of FIG. 2 indicate the same or similar components and portions.

In this figure, the control shaft 13 having a swing axis [a] can support the swing cam 11 for swing movement. An offset shaft section 13b having an axis [b] deviating from the axis [a] of the control shaft 13 supports a control arm 20 for swing movement. The control arm 20 holds a roller 20a at its distal end by a roller pin 20b for rotation. The roller pin 20b can be inserted into a slot 11a of the swing cam 11 so as to slide therein. When the control shaft 13 pivots, the roller 20a of the control arm 20 moves along the slot 11a. Consequently, the substantial arm length Lc of the control arm 20 can vary.

The rocker shaft 19 can support the rocker arm 9 for swing movement. The rocker arm 9 holds a rocker roller 18 for rotation. The rocker roller 18 can rollingly contact with the cam surface 16c of the swing cam 11.

Similarly to the first through third embodiments, the respective cam surfaces 16c are shaped so as to be different from each other between the cylinder groups. Specifically, an angle range of the base circle section (indicated by the dashed line of FIG. 11) 16e' for the suspendable cylinder group is larger than an angle range of the base circle section (indicated by the actual line of FIG. 11) 16e for the sequentially operable cylinder group.

In this embodiment, by controlling the rotational angle of the control shaft 13, the substantial arm length of the control arm 20 varies, and the swing angle of the swing cam 11 varies. Thereby, the valve opening period and lift amount change. Because the shapes of the cam surfaces of the respective swing cams 11 are different from each other between the cylinder groups, the lift amount for the suspendable cylinder group is zero when the rotational angle of the control shaft 13 is in the predetermined range. The cylinders of the suspendable cylinder group in the respective banks thus can be suspended.

In a modified embodiment, instead of making the shapes of the cam surfaces differently between the cylinder groups, deviation amounts of the offset shaft sections 13b can be made differently between them.

In the first through fourth embodiments, the valve drive device can include the camshaft or crankshaft, the swing cams driven by the camshaft or the crankshaft, the intermediate rockers driven by the respective swing cams and the rocker arms swinging together with the intermediate rockers. However, the valve drive device apply is not limited to the above embodiments. For example, the valve drive device can be configured as shown in FIGS. 12 to 15.

Figure 12:
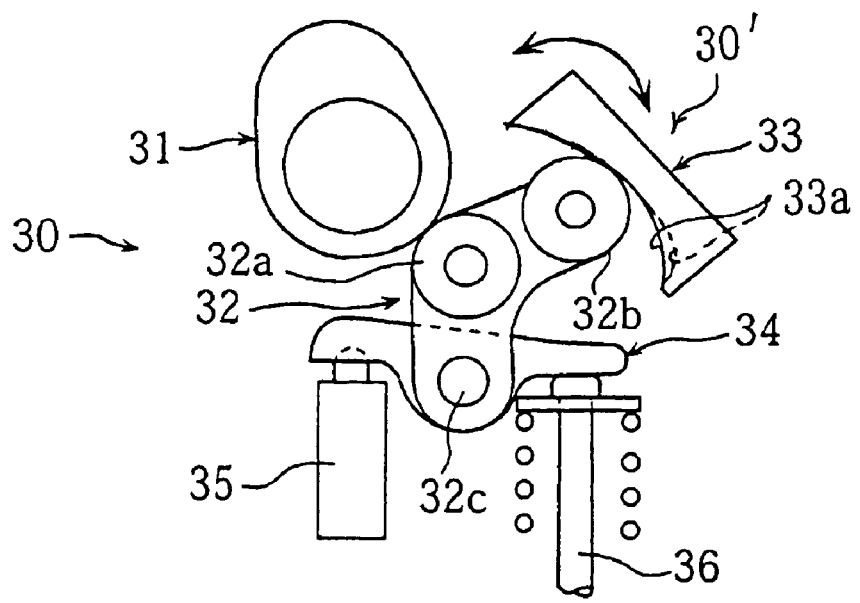
FIG. 12 is a schematic side view of another embodiment of a valve drive device.

In a valve drive device 30 of a fifth embodiment shown in FIG. 12, a change mechanism 30' can be disposed between an intake camshaft 31 and a rocker arm 34. The change mechanism 30' includes a swing lever 32 having a roller 32a positioned at a center of the lever 32 and driven by the camshaft 31, and a guide cam 33 which guides a roller 32b positioned at one end of the swing lever 32. The other end of the swing lever 32 is coupled with the rocker arm 34. Additionally, one end of the rocker arm 34 can be supported by a rush adjuster 35, while the other end thereof can push a top end of the associated intake valve 36.

The guide cam 33 of the valve drive device 30 can function as the control member. When the guide cam 33 swings in the direction indicated by the arrows of FIG. 12, a contact point of the swing lever 32 with the roller 32b changes, and the open period and the lift amount of the intake valve 36 varies.

In the fifth embodiment, similarly to the first embodiment, the cam surfaces 33a of the guide cams 33 can be shaped differently from each other between the sequentially operable cylinder group and the suspendable cylinder group. Specifically, the base circle section (indicated by the dashed line of FIG. 12) for the suspendable cylinder group is larger than the base circle section (indicated by the actual line of FIG. 12) for the sequentially operable cylinder group.

Therefore, in the fifth embodiment, the part of cylinders can be suspended using the valve position sequentially changing valve drive device without requiring a broader space or increasing a parts count and production costs.

Figure 13:
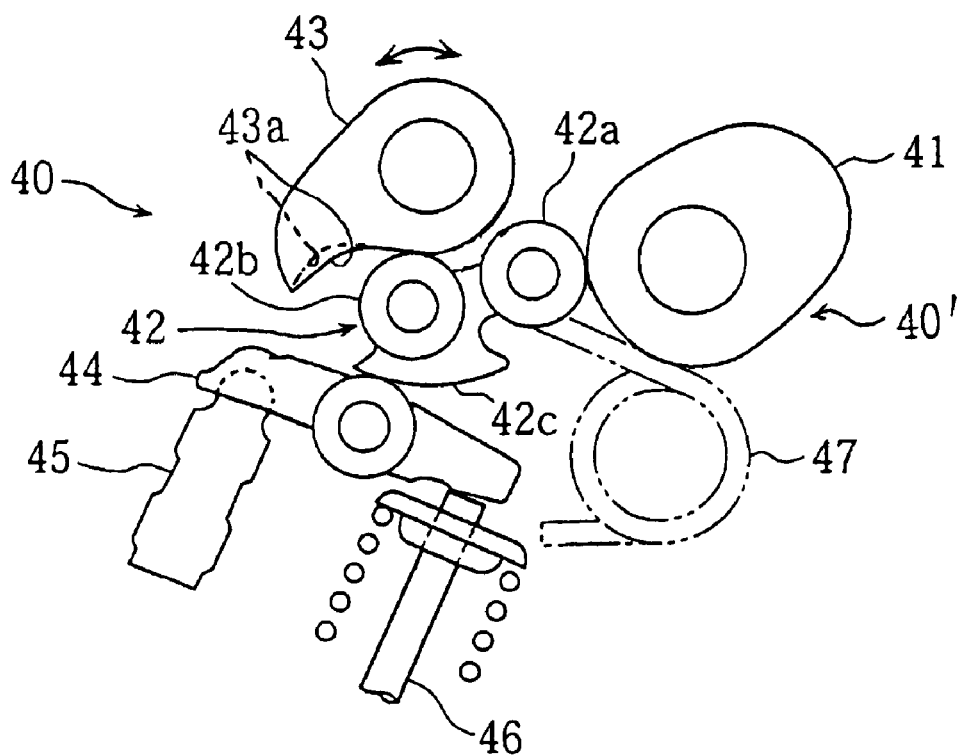
FIG. 13 is a schematic side view of another embodiment of a valve drive device.

In a sixth embodiment shown in FIG. 13, a change mechanism 40' of a valve drive device 40 cam include a swing lever 42 having a roller 42a positioned at one end thereof and is driven by a swing lever 42, and a guide cam 43 which guides a roller 42b positioned at a center of the swing lever 42. A cam surface 42c of the other end of the swing lever 42 pushes a rocker arm 44. Additionally, one end of the rocker arm 44 can be supported by a rush adjuster 45, while the other end thereof can push a top end of the associated intake valve 46. A spring 47 urges the swing lever 42 toward the guide cam 43.

The guide cam 43 of the valve drive device 40 can function as the control member. By pivoting the guide cam 43 in the direction indicated by the arrows of FIG. 13, a contact point of the swing lever 42 with the roller 42b changes, and the open period and the lift amount of the intake valve 46 varies.

In the sixth embodiment, similarly to the first embodiment, the cam surfaces 43a of the guide cams 43 can be shaped differently from each other between the sequentially operable cylinder group and the suspendable cylinder group. Specifically, the base circle section (indicated by the dashed line of FIG. 13) for the suspendable cylinder group is larger than the base circle section (indicated by the actual line of FIG. 13) for the sequentially operable cylinder group.

Therefore, in the sixth embodiment, the part of cylinders can be suspended using the valve position sequentially changing valve drive device without requiring a broader space or increasing a parts count and production costs.

Figure 14:
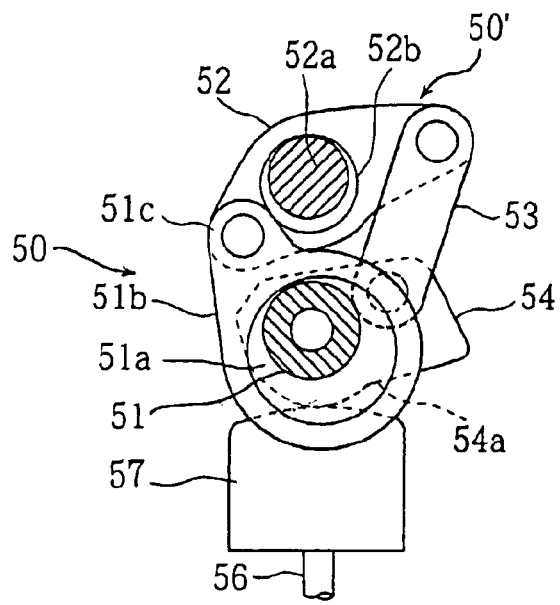
FIG. 14 is a schematic side view of another embodiment of a valve drive device.

In a valve drive device 50 of a seventh embodiment shown in FIG. 14, a change mechanism 50' can be positioned between a drive shaft 51 functioning as the drive source and a lifter 57 functioning as the valve actuator. An offset section 51a is unitarily formed with the drive shaft 51, and supports a base section of a link arm 51b for relative rotation. When the drive shaft 51 rotates under operation of the engine, a distal end 51c of the link arm 51b moves up and down in the view of FIG. 14 together with the rotation of the offset section 51a.

The change mechanism 50' can include a rocker link 52 having one end coupled with the distal end 51c of the link arm 51b and a swing cam 54 coupled with the other end of the rocker link 52 through a link plate 53. When the offset section 51a rotates, the rocker link 52 swings. The swing movement of the rocker link 52 can be transmitted to the swing cam 54 through the link plate 53 to swing the swing cam 54. The swing cam 54 then moves the lifter 57, which in turn actuates the intake valve 56.

An offset section 52b formed on a control shaft 52a supports the rocker link 52 for relative rotation. When the control shaft 52a rotates, a swing center of the rocker link 52 changes. Thereby, a transmission state of the rotation of the crankshaft 51 to the lifter 52 varies. The open period and the lift amount of the intake valve 56 are changed, accordingly.

In the seventh embodiment, similarly to the first embodiment, the cam surfaces 54a of the swing cams 54 are shaped differently from each other between the sequentially operable cylinder group and the suspendable cylinder group. Specifically, the base circle section for the suspendable cylinder group can be larger than the base circle section for the sequentially operable cylinder group.

Therefore, in the seventh embodiment, the part of cylinders can be suspended using the valve position sequentially changing valve drive device without requiring a broader space or increasing a parts count and production costs.

Also, in the seventh embodiment, the swing cam 54 can be swung in both of the opening direction and the closing direction with the rotation of the crankshaft 51. The intake valve thus can certainly open and close the intake ports.

Figure 15:
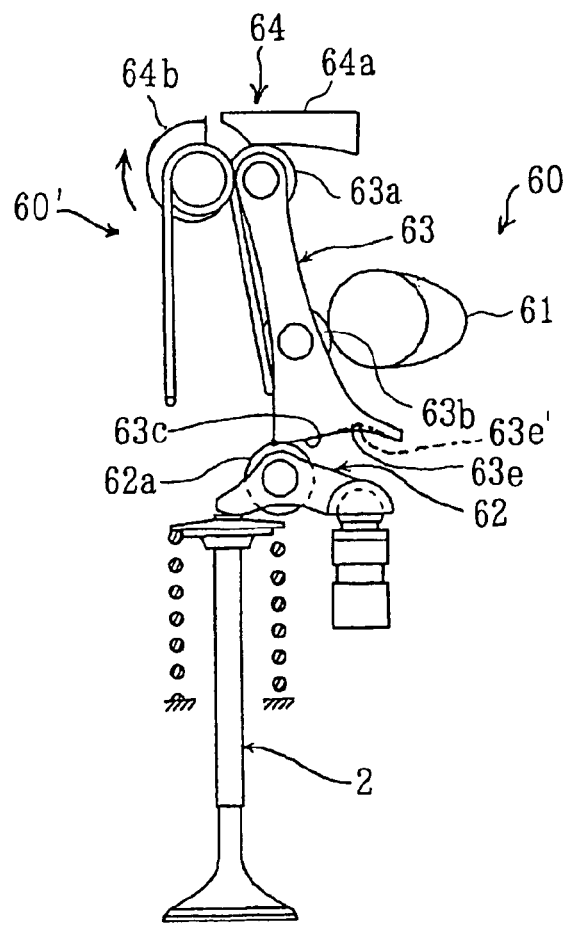
FIG. 15 is a schematic side view of another embodiment of a valve drive device.

In a valve drive device 60 of an eighth embodiment shown in FIG. 15, a change mechanism 60' can be positioned between a camshaft 61 functioning as the drive source and a rocker arm 62 functioning as the valve actuator. The change mechanism 60' can include a swing cam 63 and a cam supporting mechanism 64 which controls a position of a fulcrum roller 63a attached to a top end of the swing cam 63.

The cam supporting mechanism 64 can include a guide member 64a for guiding the fulcrum roller 63a along a guide circle which center is a roller 62a of the rocker arm 62, and a cam shaft 64b for moving the fulcrum roller 63a.

A roller 63b driven by the camshaft 61 can be attached to a middle portion of the swing cam 63. A bottom end of the swing cam 63 has a cam surface 63c which pushes the roller 62a of the rocker arm 62.

When a position of the fulcrum roller 63a of the swing cam 63 is moved, a transmission state of the rotation of the camshaft 61 to the rocker arm 62 varies. Thereby, the open period and the lift amount of the intake valve 2 are changed.

In the eighth embodiment, similarly to the first embodiment, the cam surfaces 63a of the swing cams 63 can be shaped differently from each other between the sequentially operable cylinder group and the suspendable cylinder group. Specifically, the base circle section (indicated by the dashed line of FIG. 15) 63e' for the suspendable cylinder group can be larger than the base circle section (indicated by the actual line of FIG. 15) 63e for the sequentially operable cylinder group.

Therefore, in the eighth embodiment, the part of cylinders can be suspended using the valve position sequentially changing valve drive device without requiring a broader space or increasing a parts count and production costs.

In the embodiments described above, the valve drive mechanism can be used to suspend the valves associated with particular cylinders that are to be suspended in operation. In modified embodiments, certain features and aspects of the valve drive mechanism can be used to suspend operation of one or more valves associated with a cylinder while still permitting the other valves associated with the cylinder to open and close. For example, in certain engines, each cylinder can be provided with multiple valves (e.g., two or three intake valves and two or three exhaust valves). The valve drive mechanism described above can be adapted such that under certain conditions less than all (e.g., two or one) of the multiple valves are opened during certain operating conditions. In this manner, the swirl or other characteristics of the combustion cycle can be controlled.

Accordingly, in one embodiment, a control member can be common to the respective cylinder groups, and the transmission states for the respective cylinder groups differ from each other in accordance with the control amount of the control member. Thus, in the predetermined operational range, the valve open period and the lift amount for the part of the cylinder groups can be zero, and the operation of the part of the cylinder groups can be suspended without having multiple control members. Therefore, in comparison with a structure having the multiple control members, an arrangement space for the structure of the present invention can be easily obtained. The structure of the present invention is not complicated, and the parts count and production costs do not increase.

In addition, the valve position sequentially changing valve drive device sequentially changes the valve lift amount of the part of the cylinder groups to suspend and restart the operation of the part of the cylinder groups. The mode changes from the whole cylinder operating mode to the part cylinder suspended mode and from the part cylinder suspended mode to the whole cylinder operating mode can be smoothly made. Any shocks following the mode changes can be reduced.

According to another embodiment, the control member supports the control arm for swing movement, and the control amount of the control member is varied to change the relative relationship between the position of the control arm and the position of the camshaft or the swing cam or the position of the swing cam, and the cam surface of the swing cam is configured to bring the valve lift amount to zero when the control amount of the control member is in the predetermined range. Therefore, the part cylinder suspended mode can be realized even though the common control member is used.

According to another embodiment, the base circle section of the swing cam for the part of the cylinder groups has the angular range broader than the base circle section of the swing cam for the remainder part of the cylinder groups. Thus, the valve lift amount can be zero only when the rotational angle of the control member is in the predetermined range, and the part of the cylinder groups can be suspended. That is, the part cylinder suspended mode can be realized only by the simple structure in which the shapes of the cam surfaces are properly set.

According another embodiment, the lift section of the swing cam for the part of the cylinder groups has the shape which becomes more similar to the shape of the lift section of the swing cam for the remainder part of the cylinder groups as the lift section of the swing cam for the part of the cylinder groups is spaced apart from the border thereof with the base circle becomes larger. Therefore, in the whole cylinder operation range, particularly, in a high speed and high load range, the valve lift amount for the part of the cylinder groups can be equalized to the valve lift amount for the remainder part of the cylinder groups. The shocks following the mode changes can be avoided. In addition, because the operation suspended mode is used, the maximum power of the engine does not fall.

According to another embodiment, the relative relationship between the position of the control arm and the position of the camshaft differs from each other between the cylinder groups. Thus, in such an embodiment, the deviation amount of the control shaft for the part of the cylinder group from the center of the control member is larger than the deviation amount of the control shaft for the remainder part of the cylinder group from the center of the control member; thereby, when the control member is in the predetermined angle range, the control arm for the part of the cylinder groups can be retreat more than the control arm for the remainder part of the cylinder groups. Therefore, the valve lift amount for the part of the cylinder groups can be zero, and the operation of the part of the cylinder groups can be suspended. That is, the part cylinder suspended mode can be realized only by the simple structure in which the deviation amount of the control arm from the center of the control member is properly set.

According to another embodiment, the control shaft for the part of cylinder groups is shorter than the control shaft for the remainder part of cylinder groups. Thus, the contact portion of the control shaft for the part of cylinder groups with the cam surface and the contact portion of the control shaft for the remainder part of cylinder groups with the cam surface approach each other closer when the control member leaves from the predetermined angle range further. Accordingly, in the whole cylinder operating range, particularly, in a high speed and high load range, the valve lift amount for the part of the cylinder group can be equalized to the valve lift amount for the remainder part of the cylinder groups. In addition, because the operation suspended mode is used, the maximum power of the engine does not fall.

Certain objects and advantages of the invention have been described above for describing the invention and the advantages achieved over the prior art. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations and/or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A multiple cylinder engine comprising:
   plurality of cylinders, each cylinder including a valve configured to open and close a port associated with each of the respective cylinders, the cylinders comprising at least a first cylinder group and a second cylinder group;
   a drive shaft configured to rotate about an axis;
   a plurality of valve actuators configured to transmit rotational movement of the drive shaft to the valves;
   a change mechanism comprising a control member that is configured to change a transmission state of the rotational movement transmitted from the drive shaft to the valve actuators, the change mechanism configured to sequentially change an open period and a largest lift amount of each valve by changing a control amount of the control member;
   wherein the control member is common to the first and second cylinder groups and wherein the transmission states for the first cylinder group differ from the transmission states of the second cylinder group in accordance with the control amount of the control member, and the valve open period and the largest lift amount of the valves in the first cylinder group is capable of being set to zero in a predetermined operational range to suspend operation of the first cylinder group;
   wherein the drive shaft includes a camshaft driven by a crankshaft;
   the valve actuator includes a rocker arm supported for swing movement;
   the change mechanism includes a swing cam supported for swing movement to follow the camshaft, and a control arm positioned between the swing cam and the camshaft or the rocker arm and supported by the control member for swing movement, the control amount of the control member is varied to change a relative relationship between a position of control arm and a position of the camshaft or a position of swing cam so as to sequentially change the open period and the largest lift amount of the valve; and
   wherein a cam surface of the swing cam has a shape which differs between the first and second cylinder groups, the cam surface of the swing cam for the first cylinder group is configured to bring a valve lift amount to zero when the control amount of the control member is in the predetermined range.

2. The multiple cylinder engine according to claim 1, wherein the control arm is positioned between the cam surface of the swing cam and the rocker arm, a relative relationship between a position of the control arm and a position of the cam surface is changed when a rotational angle of the control member is changed; thereby, the open period and the largest lift amount of said each valve is sequentially controllable.

3. The multiple cylinder engine according to claim 2, wherein the cam surface of the swing cam includes a base circle section and a lift section, the base circle section includes a circular arc which center is consistent with a center of the swing movement of the swing cam and makes the valve lift amount zero irrespective of a swing angle of the swing cam, the lift section increases the valve lift amount with the swing angle increasing, and the base circle section of the swing cam for first cylinder group has an angular range greater than the base circle section of the swing cam for the second cylinder group.

4. The multiple cylinder engine according to claim 3, wherein the lift section of the swing cam for the first cylinder group has a shape which becomes more similar to a shape of the lift section of the swing cam for the second cylinder group as the lift section of the swing cam for first cylinder group is spaced apart from a border thereof with the base circle towards the lift section.

5. A multiple cylinder engine comprising:
   a plurality of cylinders, each cylinder including a valve configured to open and close a port associated with each of the respective cylinders, the cylinders comprising at least a first cylinder group and a second cylinder group;
   a drive shaft configured to rotate about an axis;
   a plurality of valve actuators configured to transmit rotational movement of the drive shaft to the valves;
   a change mechanism comprising a control member that is configured to change a transmission state of the rotational movement transmitted from the drive shaft to the valve actuators, the change mechanism configured to sequentially change an open period and a largest lift amount of each valve by changing a control amount of the control member;
   wherein the control member is common to the first and second cylinder groups and wherein the transmission states for the first cylinder group differ from the transmission states of the second cylinder group in accordance with the control amount of the control member, and the valve open period and the largest lift amount of the valves in the first cylinder group is capable of being set to zero in a predetermined operational range to suspend operation of the first cylinder group; wherein
   the drive shaft includes a camshaft driven by a crankshaft;
   the valve actuator includes a rocker arm supported for swing movement;
   the change mechanism includes a swing cam supported for swing movement to follow the camshaft, a control arm positioned between the swing cam and the camshaft or the rocker arm and supported by the control member for swing movement, the control amount of the control member is varied to change a relative relationship between a position of the control arm and a position of the camshaft or a position of the swing cam so as to sequentially change the open period and the largest lift amount of the valve;

a relative relationship between a position of the control arm and a position of the camshaft or a position of the swing cam differs from each other between the first and second cylinder group, the relative relationship for the first cylinder group is configured to bring a valve lift amount to zero when the control amount of the control member is in the predetermined range.

6. The multiple cylinder engine according to claim 5, wherein the control arm is coupled with the control member at a position which is out of a pivot center of the control member, a deviation amount of the control arm for the first cylinder group from the center of the control member is larger than a deviation amount of the control arm for the second cylinder group from the center of the control member, a contact portion at which the control arm for the first cylinder group contacts with a cam surface retreats toward a base circle section of the cam surface more than a contact portion at which the control arm for the second cylinder group contacts with an associated cam surface when the control member is in a predetermined angle range.

7. The multiple cylinder engine according to claim 6, wherein the control arm for the first cylinder group is shorter than the control arm for the second cylinder group, as the control member leaves from the predetermined angle range further, the contact portion of the control arm for the first cylinder group with the cam surface and the contact portion of the control arm for the second cylinder group with the cam surface approach closer to each other.

8. A multiple cylinder engine comprising:

a plurality valves comprising a first group of valves and a second group of valves;

a drive shaft configured to rotate about an axis;

a plurality of valve actuators configured to transmit rotational movement of the drive shaft to the plurality of valves;

a plurality change mechanisms configured to change an open period or a largest lift amount of each of the valves by changing a control amount of a control member that is common to the plurality of change mechanisms, the control member configured to change a state of the rotational movement transmitted from the drive shaft to the valve actuators by changing the control amount of the control member;

wherein as the control amount of the control member is changed, the transmission states for the first group of valves differ from the transmission states for the second group of valves, wherein:

the drive shaft includes a camshaft driven by a crankshaft;

the valve actuator includes a rocker arm supported for swing movement;

each of the plurality of change mechanisms includes a swing cam supported for swing movement to follow the camshaft, and a control arm positioned between the swing cam and the camshaft or the rocker arm and, the control arm is supported by the control member for swing movement, the control amount of the control member is varied to change a relative relationship between a position of control arm and a position of the camshaft or a position of the swing cam so as to sequentially change the open period and the largest lift amount of the valve.

9. The multiple valve engine of claim 8, wherein a cam surface of the swing cam for the change mechanism of the first group of valves has a shape which differs from a shape of a cam surface of the swing cam for the change mechanism of the second group of valves.

10. The multiple valve engine of claim 8, wherein the control arm is coupled to the control member at a position which is out of a pivot center of the control member, a deviation amount of the control arms for the change mechanism associated with the first group of valves being different than a deviation amount of the control arms for the change mechanism associated with the second group of valves.

* * * * *